US 8,848,274 B2

(12) United States Patent
Ozawa

(10) Patent No.: US 8,848,274 B2
(45) Date of Patent: Sep. 30, 2014

(54) ELECTRO-OPTICAL DEVICE AND ELECTRONIC APPARATUS

(75) Inventor: Norihiko Ozawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 181 days.

(21) Appl. No.: 13/312,324

(22) Filed: Dec. 6, 2011

(65) Prior Publication Data

US 2012/0162742 A1 Jun. 28, 2012

(30) Foreign Application Priority Data

Dec. 28, 2010 (JP) .................................. 2010-292045

(51) Int. Cl.
*G02F 1/03* (2006.01)
*G02F 1/29* (2006.01)
*G02F 1/1335* (2006.01)
*G02F 1/1337* (2006.01)

(52) U.S. Cl.
CPC ................................ *G02F 1/133526* (2013.01)
USPC ........... 359/245; 359/319; 359/321; 359/238; 349/95; 349/123

(58) Field of Classification Search
USPC ......... 359/237, 238, 245, 279, 619–621, 634, 359/319, 455, 462, 463, 465, 558; 362/19, 362/331; 353/31, 84, 7; 342/45, 123, 160, 342/181, 192; 349/15, 33, 95, 106; 250/310, 311, 492.1, 492.3, 492.21
See application file for complete search history.

(56) References Cited

U.S. PATENT DOCUMENTS

| 5,187,599 | A | | 2/1993 | Nakanishi et al. |
| 5,315,330 | A | * | 5/1994 | Hamada ........................ 353/31 |
| 6,995,916 | B2 | * | 2/2006 | Yamanaka et al. ............ 359/619 |
| 7,087,180 | B2 | | 8/2006 | Kaise et al. |
| 7,683,989 | B2 | * | 3/2010 | Woodgate et al. ............ 349/123 |
| 7,737,422 | B2 | * | 6/2010 | Platzgummer et al. ..... 250/492.3 |
| 7,760,430 | B2 | * | 7/2010 | Shestak et al. ................ 359/465 |
| 2011/0013102 | A1 | | 1/2011 | Miyazaki et al. |
| 2011/0109818 | A1 | | 5/2011 | Uneda et al. |

FOREIGN PATENT DOCUMENTS

| JP | 2552389 B | 11/1996 |
| JP | 4207599 B | 1/2009 |
| JP | 2010-271687 A | 12/2010 |
| JP | 2011-118324 A | 6/2011 |

* cited by examiner

*Primary Examiner* — Loha Ben
(74) *Attorney, Agent, or Firm* — ALG Intellectual Property, LLC

(57) ABSTRACT

An electro-optical device includes an electro-optical material, a first lens which is arranged at an incident side of the light and is provided so as to correspond to a pixel, and a condenser lens which is arranged at an emitting side of the light and is provided so as to correspond to the pixel. Condensation degrees of the first lens are larger than that of the second lens, and distances between the first lens and the electro-optical material are smaller than distances between the second lens and the electro-optical material.

7 Claims, 6 Drawing Sheets

ELECTRO-OPTICAL DEVICE AND ELECTRONIC APPARATUS

BACKGROUND

1. Technical Field

The present invention relates to a technical field of an electro-optical device such as a liquid crystal display device, for example, and an electronic apparatus including the electro-optical device, such as a liquid crystal projector, for example.

2. Related Art

As an electro-optical device of this type, there is an electro-optical device which tries to enhance utilization efficiency of light used for display using microlenses each of which corresponds to each of a plurality of pixels, for example. For example, a technique in which microlenses are provided on each of a substrate at a light incident side and a substrate at a light emitting side has been disclosed in Japanese Patent No. 4207599.

In the electro-optical device in which microlenses are provided at each of the light incident side and the light emitting side as described above, the following problem may arise. That is, in the above electro-optical device, there may arise a problem that light condensed on the microlenses at the incident side is diffused on the microlenses at the emitting side. Therefore, for example, a technique in which focal distances of the microlenses at the light incident side are made larger than focal distances of the microlenses at the light emitting side has been proposed in Japanese Patent No. 2552389.

However, in the above Japanese Patent No. 2552389, the focal distances of the two microlenses provided at the light incident side and the light emitting side are referred but a positional relationship therebetween is not described in detail. Accordingly, even if the focal distances of the two microlenses are appropriately adjusted, there is a risk that diffusion of light on the microlenses at the emitting side cannot be suppressed. That is to say, in the technique described in Japanese Patent No. 2552389, there is a technical problem that quality of a display image cannot be necessarily enhanced.

SUMMARY

An advantage of some aspects of the invention is to provide an electro-optical device which can display a bright image with high quality and an electronic apparatus.

An electro-optical device according to an aspect of the invention which modulates light incident on a display region formed by a plurality of pixels and emits the light includes an electro-optical material, first condenser lenses which are arranged at an incident side of the light and each of which is provided so as to correspond to each of the plurality of pixels, and second condenser lenses which are arranged at an emitting side of the light and each of which is provided so as to correspond to each of the plurality of pixels. In the electro-optical device, condensation degrees of the first condenser lenses are larger than condensation degrees of the second condenser lenses, and distances between the first condenser lenses and the electro-optical material are smaller than distances between the second condenser lenses and the electro-optical material.

With the electro-optical device according to the aspect of the invention, when the electro-optical device is operated, light to be irradiated from a white light source or the like, for example, is incident on the display region formed by the plurality of pixels, at first. The light which is incident on the display region penetrates through the electro-optical material such as a liquid crystal, for example, on each of the plurality of pixels, and is modulated depending on a state of the electro-optical material. Therefore, an image can be displayed using the light emitted from the display region.

The electro-optical material is sandwiched between and held by a pair of substrates. The pair of substrates is constituted by an element substrate having various electrodes such as pixel electrodes and pixel transistors, for example, and wirings and a counter substrate having counter electrodes. The first condenser lenses each of which is provided so as to correspond to each of the plurality of pixels are arranged at the light incident side when seen from the electro-optical material. Further, the second condenser lenses each of which is provided so as to correspond to each of the plurality of pixels are arranged at the light emitting side when seen from the electro-optical material. It is to be noted that the first condenser lenses and the second condenser lenses may be mounted in the above pair of substrates or may be provided as an another entity which is separated from the pair of substrates.

In particular, the condensation degrees of the first condenser lenses are set to be larger than the condensation degrees of the second condenser lenses. It is to be noted that the "condensation degree" indicates a degree that incident light is collected at one point. As the condensation degree is larger, a light beam at a focal point is smaller. Further, the distances between the first condenser lenses and the electro-optical material are set to be smaller than the distances between the second condenser lenses and the electro-optical material. That is to say, the first condenser lenses are arranged at positions closer to the electro-optical material in comparison with the second condenser lenses.

With the above configuration, the light which is incident on the device is condensed by the first condenser lenses, at first. The condensation degrees of the first condenser lenses are larger than the condensation degrees of the second condenser lenses and the first condenser lenses are closer to the electro-optical material in comparison with the second condenser lenses. Therefore, the first condenser lenses can appropriately condense the incident light on each of the plurality of pixels. Accordingly, light can be suppressed from being shielded by a black matrix or the like which defines each pixel, for example. This makes it possible to enhance utilization efficiency of light.

The light condensed by the first condenser lenses passes through the electro-optical material, and then, is condensed by the second condenser lenses. The condensation degrees of the second condenser lenses are smaller than those of the first condenser lenses and the second condenser lenses are farther from the electro-optical material in comparison with the first condenser lenses. Therefore, the second condenser lenses can preferably condense the light which is diffused after being condensed by the first condenser lenses and emit the light to a projection lens or the like for projecting an image. The light which is not deviated from an F value or the like of the projection lens, for example, can be emitted by the second condenser lenses. This makes it possible to further enhance utilization efficiency of light.

It is assumed that the first condenser lenses and the second condenser lenses are provided under the same condition (that is, condensation degrees thereof are the same and distances from them to the electro-optical material are also the same). Note that all of lights which are incident on the second condenser lenses are not necessarily parallel lights perfectly. Therefore, in this case, there is a risk that the light cannot be sufficiently condensed by the second condenser lenses or is diffused. The light which has been diffused in this manner is deviated from the F value or the like of the projection lens, and causes reduction in brightness of an image, as a result.

However, in the aspect of the invention, the condensation degrees of the first condenser lenses are set to be larger than the condensation degrees of the second condenser lenses and the distances between the first condenser lenses and the electro-optical material are set to be smaller than the distances between the second condenser lenses and the electro-optical material, as described above. Accordingly, appropriate condensation can be realized on the first condenser lenses and the second condenser lenses. This makes it possible to effectively enhance utilization efficiency of light which is incident on the device.

It is to be noted that effects obtained by the aspect of the invention are significantly exhibited when a light source of which angle distribution of light to be irradiated therefrom is large, such as a light emitting diode (LED) light source, is used.

As described above, with the electro-optical device according to the aspect of the invention, a bright image can be displayed with high quality.

In the electro-optical device according to another aspect of the invention, it is preferable that lens effective diameters of the first condenser lenses be larger than lens effective diameters of the second condenser lenses.

According to the aspect of the invention, the condensation degrees of the first condenser lenses can be easily made larger than the condensation degrees of the second condenser lenses. To be more specific, two lenses having different condensation degrees can be realized by adjusting lens effective diameters without making the shapes of the first condenser lenses and the second condenser lenses different from each other. Accordingly, a bright image can be displayed with high quality without making a manufacturing process be highly complicated.

In the electro-optical device according to another aspect of the invention, it is preferable that the electro-optical device further include a pair of substrates which sandwich and hold the electro-optical material, the first condenser lenses be mounted in the substrate at the incident side of the light in the pair of substrates, and the second condenser lenses be mounted in the substrate at the emitting side of the light in the pair of substrates.

According to the aspect of the invention, the first condenser lenses and the second condenser lenses are mounted in the pair of substrates which sandwich and hold the electro-optical material. Therefore, positional adjustment between the first condenser lenses and the second condenser lenses and the electro-optical material or between the first condenser lenses and the second condenser lenses and members on the pair of substrates can be made extremely easy. Accordingly, a bright image can be displayed with high quality without making a manufacturing process be highly complicated.

It is preferable that an electronic apparatus according to another aspect of the invention include the electro-optical device according to the above aspect of the invention (including various modes thereof).

The electronic apparatus according to the aspect of the invention includes the electro-optical device according to the above aspect of the invention. Therefore, various electronic apparatuses such as a projection-type display apparatus, a television, a portable phone, an electronic organizer, a word processor, view finder-type and direct monitoring-type video tape recorders, a workstation, a videophone, a POS terminal and a touch panel, which can display with high quality, can be realized. Further, as the electronic apparatus according to the aspect of the invention, electrophoretic devices such as an electronic paper can be also realized.

Effects and other advantages of the aspects of the invention will be obvious from a mode for carrying out the aspects of the invention, which will be described later.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention is described with reference to drawings.

Electro-Optical Device

An electro-optical device according to the embodiment is described with reference to FIG. 1 to FIG. 7. It is to be noted that in the following embodiment, a liquid crystal device of a thin film transistor (TFT) active matrix driving system with a built-in driving circuit is described as an example of the electro-optical device according to the invention.

First Embodiment

Figure 1:
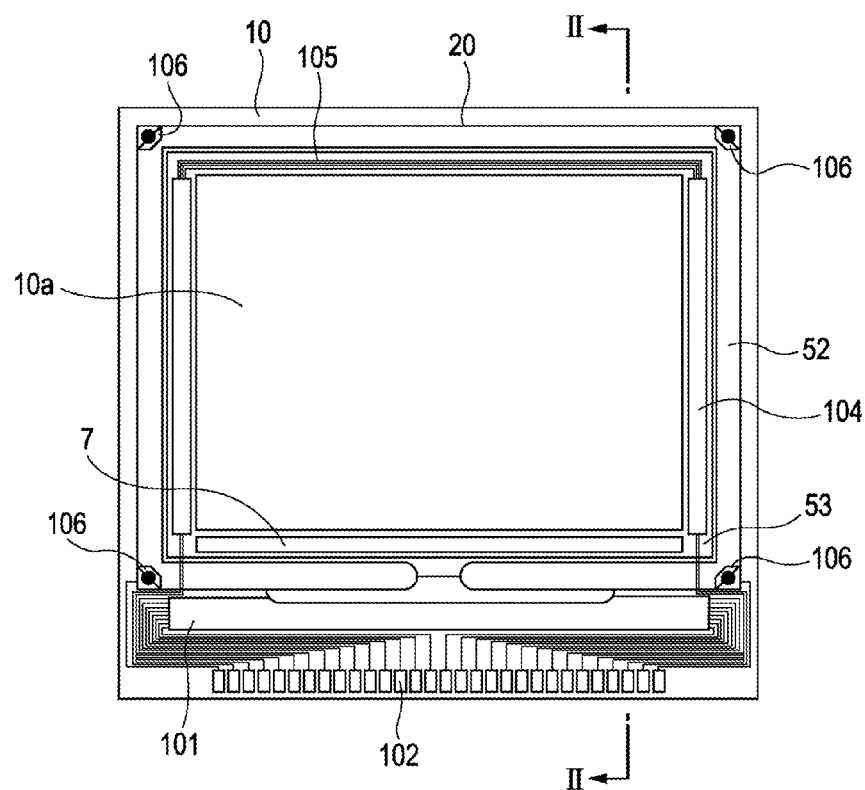
FIG. 1 is a plan view illustrating an entire configuration of an electro-optical device according to an embodiment.
Figure 2:
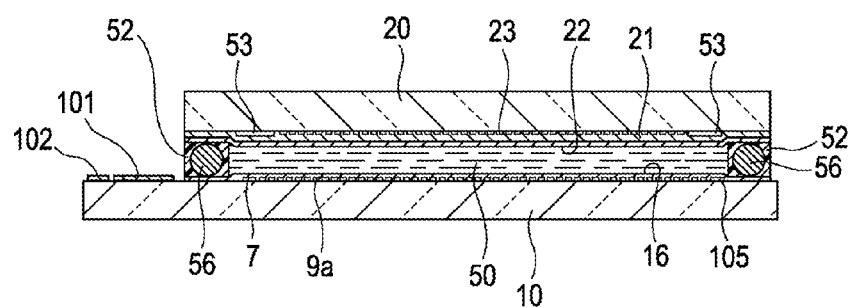
FIG. 2 is a cross-sectional view cut along a line II-II in FIG. 1.

At first, an entire configuration of the electro-optical device according to the embodiment is described with reference to FIG. 1 and FIG. 2. FIG. 1 is a plan view illustrating the entire configuration of the electro-optical device according to the embodiment. FIG. 2 is a cross-sectional view cut along a line II-II in FIG. 1.

In FIG. 1 and FIG. 2, a TFT array substrate 10 and a counter substrate 20 are arranged on the electro-optical device according to the embodiment so as to be opposed to each other. The TFT array substrate 10 and the counter substrate 20 are an example of a "pair of substrates" according to the invention. The TFT array substrate 10 is formed by a transparent substrate such as a quartz substrate and a glass substrate, a silicon substrate, or the like, for example. The counter substrate 20 is formed by a transparent substrate such as a quartz substrate and a glass substrate, for example. A liquid crystal layer 50 as an example of an "electro-optical material" according to the invention is sealed between the TFT array substrate 10 and the counter substrate 20. The liquid crystal layer 50 is formed by one type of a nematic liquid crystal or a liquid crystal in which several types of nematic liquid crystals are mixed. The liquid crystal layer 50 is made into a predetermined alignment state between a pair of alignment films.

The TFT array substrate 10 and the counter substrate 20 are adhered to each other by a sealing member 52. The sealing member 52 is provided on a sealing region located in the periphery of an image display region 10*a*. A plurality of pixels are provided on the image display region 10*a* in matrix form.

The sealing member 52 is formed by an ultraviolet curable resin, a heat curable resin, or the like, for example, for bonding both of the substrates. The sealing member 52 is coated on the TFT array substrate 10 in a manufacturing process, and then, is cured by ultraviolet irradiation, heating, or the like. A gap member such as glass fibers or glass beads is dispersed in the sealing member 52. The gap member is provided to obtain a predetermined space (that is, gap between the substrates) between the TFT array substrate 10 and the counter substrate 20. It is to be noted that the gap member may be arranged on the image display region 10*a* or a peripheral region located in the periphery of the image display region 10*a* in addition to or in place of mixing into the sealing member 52.

A frame-shaped light shielding film 53 having a light shielding property is provided adjacent to the counter substrate 20 so as to be parallel with an inner side of the sealing region on which the sealing member 52 is arranged. The frame-shaped light shielding film 53 defines a frame region of the image display region 10*a*. It is to be noted that a part or the entire of the frame-shaped light shielding film 53 may be provided adjacent to the TFT array substrate 10 as a built-in light shielding film.

In the peripheral region, a data line driving circuit 101 and external circuit connection terminals 102 are provided along one side of the TFT array substrate 10 on a region located at the outside of the sealing region on which the sealing member 52 is arranged. Further, scanning line driving circuits 104 are provided along two sides adjacent to the above one side of the TFT array substrate so as to be covered by the frame-shaped light shielding film 53. A plurality of wirings 105 are provided for connecting the two scanning line driving circuits 104 provided at both sides of the image display region 10*a*. The wirings 105 are provided along the other side of the TFT array substrate 10 so as to be covered by the frame-shaped light shielding film 53.

Vertical conducting terminals 106 are arranged on the TFT array substrate 10 at regions opposed to four corners of the counter substrate 20 in order to connect both the substrates through vertical conducting materials. Therefore, the TFT array substrate 10 and the counter substrate 20 can be electrically conducted with each other with the vertical conducting terminals 106.

In FIG. 2, a laminate structure in which pixel switching TFTs as driving elements, wirings such as scanning lines and data lines are configured is formed on the TFT array substrate 10. Although a detail configuration of the laminate structure is not illustrated in FIG. 2, pixel electrodes 9*a* formed with a transparent material such as Indium Tin Oxide (ITO) are formed on the laminate structure in a predetermined pattern for each pixel. The pixel electrodes 9*a* are formed into island forms.

The pixel electrodes 9*a* are formed on the image display region 10*a* on the TFT array substrate 10 so as to be opposed to the counter electrode 21. An alignment film 16 is formed on a surface of the TFT array substrate 10 to which the liquid crystal layer 50 faces, that is, on the pixel electrodes 9*a*. The alignment film 16 is formed so as to cover the pixel electrodes 9*a*.

A light shielding film 23 is formed on an opposing surface of the counter substrate 20, which is opposed to the TFT array substrate 10. The light shielding film 23 is formed on the opposing surface of the counter substrate 20 in a grid pattern when seen from the above, for example. Non-opening regions are defined by the light shielding film 23 on the counter substrate 20. The regions divided by the light shielding film 23 correspond to opening regions through which light emitted from a lamp for a projector or a direct-viewing backlight, for example, is transmitted. It is to be noted that the light shielding film 23 may be formed in a stripe pattern and the non-opening regions may be defined by the light shielding film 23 and the various components such as data lines provided on the side of the TFT array substrate 10.

Counter electrodes 21 formed with a transparent material such as ITO are formed on the light shielding film 23 so as to be opposed to the plurality of pixel electrodes 9*a*. A color filter (not illustrated in FIG. 2) may be formed on the light shielding film 23 at a region including portions of the opening regions and the non-opening regions for performing color display on the image display region 10*a*. An alignment film 22 is formed on the counter electrodes 21 on the opposing surface of the counter substrate 20.

A sampling circuit, a precharge circuit, an inspection circuit, and the like may be formed on the TFT array substrate 10 as illustrated in FIG. 1 and FIG. 2 in addition to the above-described driving circuits such as the data line driving circuit 101, the scanning line driving circuits 104, and the like. The sampling circuit samples an image signal on an image signal line and supplies the image signal to the data lines. The precharge circuit is a circuit for supplying a precharge signal at a predetermined voltage level to a plurality of data lines previous to the image signal. The inspection circuit is a circuit for inspecting quality, defects, and the like of the electro-optical device during the manufacturing or at the time of shipping.

Further, in addition to the above members, microlenses for condensing incident light are provided on the electro-optical device according to the embodiment although they are not illustrated in FIG. 1 and FIG. 2. A configuration of the microlenses will be described in detail later.

Figure 3:
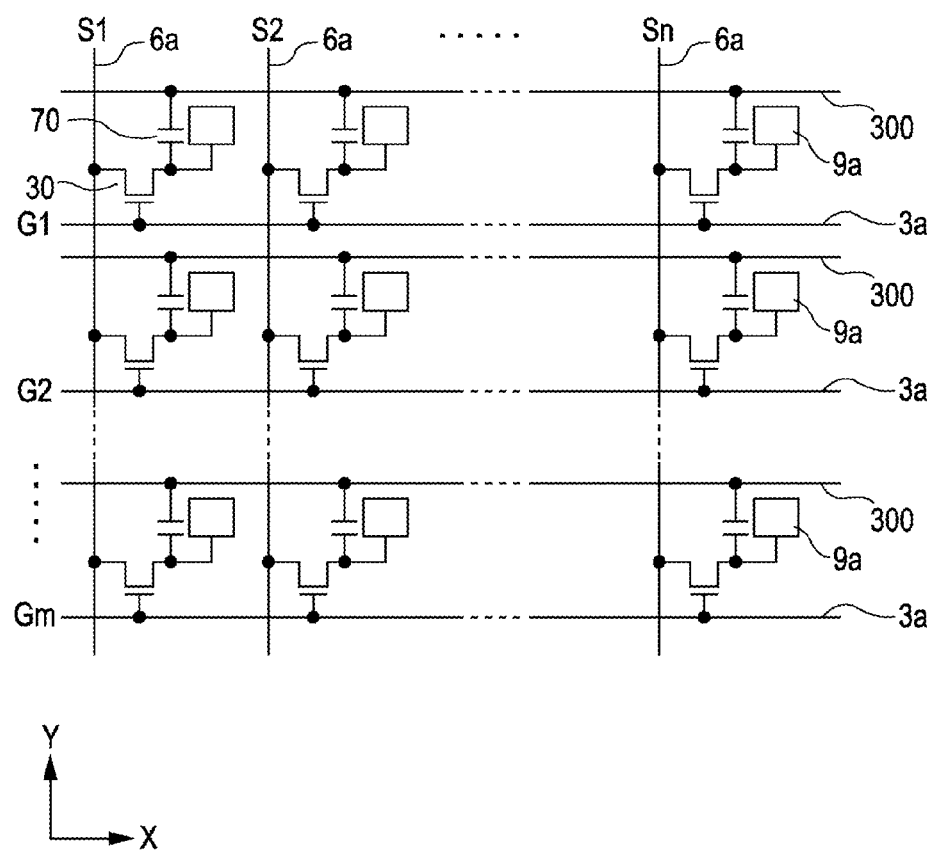
FIG. 3 is an equivalent circuit diagram illustrating various elements, wirings, and the like on a plurality of pixels on the electro-optical device according to an embodiment.

Next, an electrical configuration of a pixel portion of the electro-optical device according to the embodiment is described with reference to FIG. 3. FIG. 3 is an equivalent circuit diagram illustrating various types of elements, wirings, and the like on the plurality of pixels formed into matrix form. The plurality of pixels constitute the image display region of the electro-optical device according to the embodiment.

In FIG. 3, the pixel electrode 9*a* and a TFT 30 are formed on each of the plurality of pixels formed into matrix form, which constitute the image display region 10*a*. Each TFT 30 is electrically connected to each pixel electrode 9*a* and carries out switching-control the pixel electrode 9 when the electro-optical device according to the embodiment is operated. Data lines 6*a* through which image signals are supplied are electrically connected to sources of the TFTs 30. Image signals S1, S2, ..., Sn which are written into the data lines 6*a* may be line-sequentially supplied in this order, or may be supplied to the plurality of data lines 6*a* adjacent to each other in groups.

Further, scanning lines 3*a* are electrically connected to gates of the TFTs 30. In the electro-optical device according to the embodiment, scanning signals G1, G2, ..., Gm are line-sequentially applied to the scanning lines 3*a* in this order at a predetermined timing in a pulse manner. The pixel electrodes 9*a* are electrically connected to drains of the TFTs 30. The image signals S1, S2, ..., Sn supplied from the data lines 6a are written into the pixel electrodes 9a at a predetermined timing by closing switches of the TFTs 30 as switching elements for a certain period of time. The image signals S1, S2, . . . , Sn at a predetermined level, which have been written into the liquid crystal as an example of the electro-optical material through the pixel electrodes 9a, are held between the liquid crystal and the counter electrodes formed on the counter substrate for a certain period of time.

Alignment and order of molecular aggregation on the liquid crystal constituting the liquid crystal layer 50 (see, FIG. 2) are changed depending on a voltage level to be applied so as to modulate light and perform gradation display. For example, in a normally white mode, transmittance of the incident light decreases in each pixel unit depending on a voltage to be applied. In a normally black mode, transmittance of the incident light increases in each pixel unit depending on the voltage to be applied. Therefore, light having a contrast corresponding to an image signal is emitted as a whole from the electro-optical device.

In order to prevent the held image signals from being leaked, a storage capacitor 70 is added on each pixel so as to be parallel with a liquid crystal capacitor. The liquid crystal capacitor is formed between each pixel electrode 9a and each counter electrode 21 (see, FIG. 2). The storage capacitor 70 is a capacitor element functioning as a holding capacitor which temporarily holds a potential of each pixel electrode 9a in accordance with the supply of the image signal. One electrode of each storage capacitor 70 is electrically connected to the drain of each TFT 30 so as to be parallel with each pixel electrode 9a. The other electrode of each storage capacitor 70 is electrically connected to a capacitor line 300 of which potential is fixed so as to have a constant potential. A potential holding characteristic on the pixel electrodes 9a is improved by the storage capacitors 70 so that improvement of display characteristics including improvement of contrast and reduction in flicker can be realized.

Figure 4:
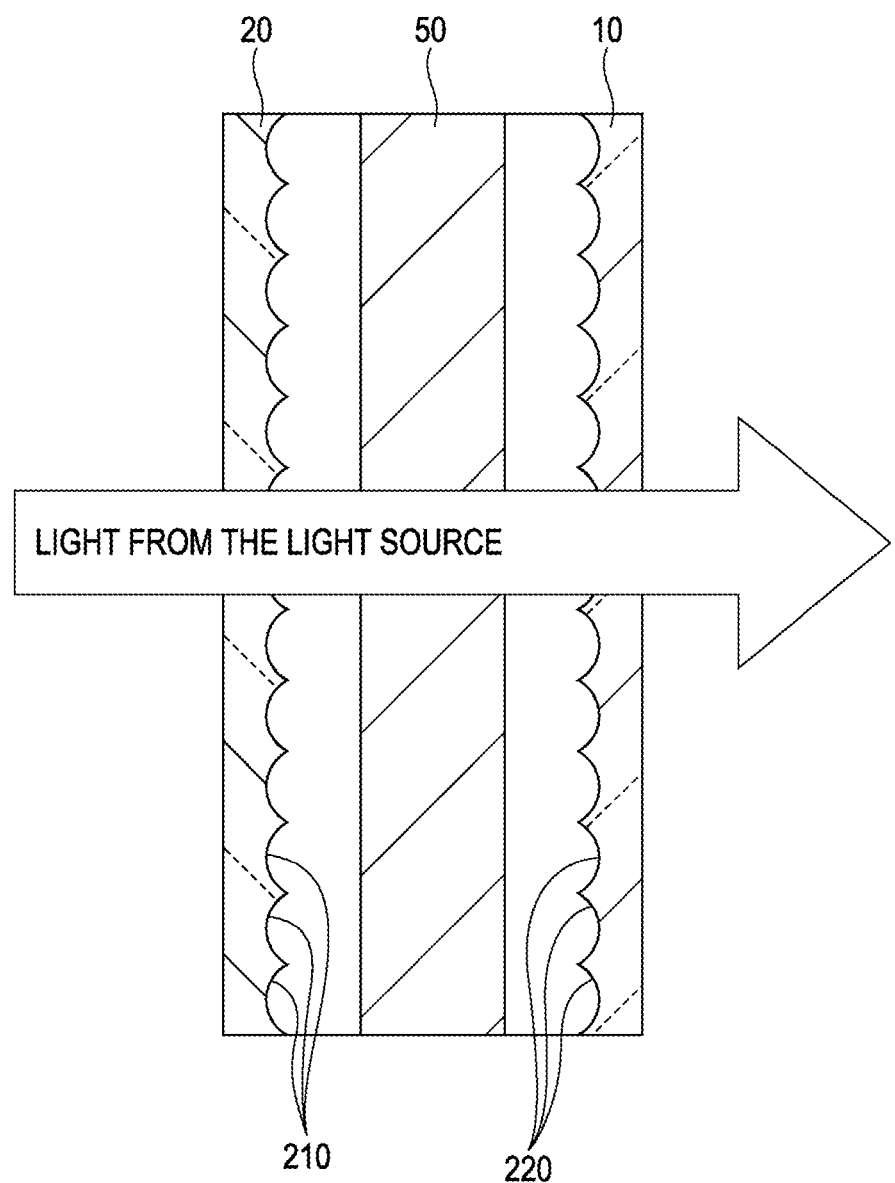
FIG. 4 is a side view illustrating arrangement positions of microlenses.
Figure 5:
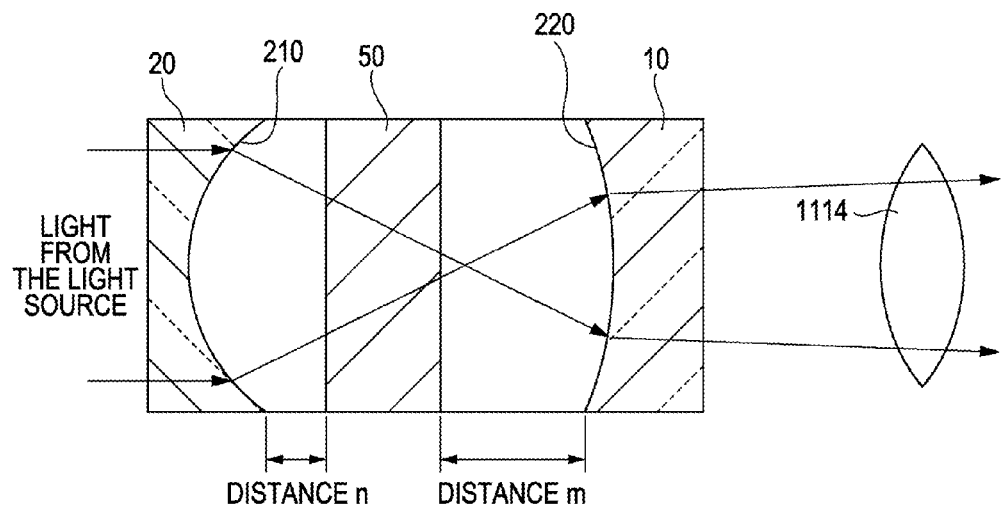
FIG. 5 is a (first) enlarged side view conceptually illustrating a state where light emitted from the microlenses is incident on a projection lens.
Figure 6:
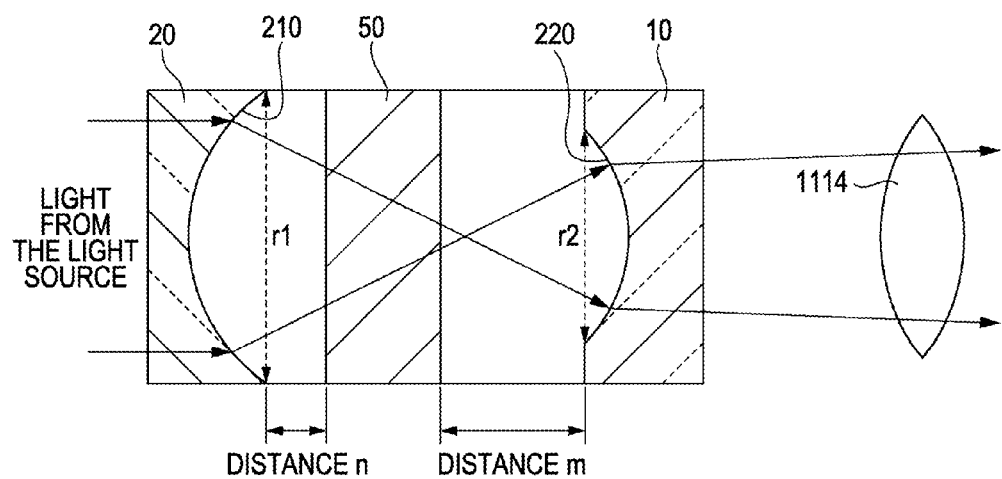
FIG. 6 is a (second) enlarged side view conceptually illustrating a state where light emitted from the microlenses is incident on the projection lens.

Next, microlenses provided on the electro-optical device according to the embodiment are described in detail with reference to FIG. 4 to FIG. 6. FIG. 4 is a side view illustrating arrangement positions of the microlenses. Further, FIG. 5 and FIG. 6 are enlarged side views conceptually illustrating a state where light emitted from the microlenses is incident on a projection lens. It is to be noted that in the drawings subsequent to FIG. 4, only members which are necessary for description are illustrated among members constituting the device and other members are omitted appropriately.

In FIG. 4, first microlenses 210 as an example of "first condenser lenses" according to the invention are provided on the counter substrate 20 (that is, substrate at the light incident side) on the electro-optical device according to the embodiment. Further, second microlenses 220 as an example of "second condenser lenses" according to the invention are provided on the TFT substrate 10 (that is, substrate at the light emitting side). Each of the first microlenses 210 and each of the second microlenses 220 are provided so as to correspond to each pixel. Further, each of the first microlenses 210 and the second microlenses 220 constitutes a microlens array plate.

In this manner, if the microlens array plates are arranged such that each of the microlenses 210, 220 corresponds to each pixel of the electro-optical device, the first microlenses 210 arranged so as to correspond to the opening regions of the pixels divide a light flux from the light source and condense each of the divided light flux so as to make a diameter of each divided light flux thinner. Therefore, light, which should travel to the non-opening region of each pixel if the first microlens 210 is not arranged, can be guided into the opening region of each pixel by the first microlens 210. Further, light emitted from each pixel can be made to be light which is not deviated from an F value or the like of a projection lens 1114 by the second microlens 220 so as to be emitted. This makes it possible to further enhance utilization efficiency of light.

The first microlenses 210 and the second microlenses 220 are formed by patterning the counter substrate 20 and the TFT substrate 10, respectively, into lens shapes and superimposing members having different refractive indexes on one another, for example.

It is to be noted that the first microlenses 210 and the second microlenses 220 may be provided to be separated from the counter substrate 20 and the TFT substrate 10 (for example, as microlens substrates) without being mounted in the counter substrate 20 and the TFT substrate 10, respectively, as illustrated in FIG. 4.

In FIG. 5, condensation degrees of the first microlenses 210 are set to be larger than condensation degrees of the second microlenses 220. To be more specific, curvatures of the first microlenses 210 are set to be larger than curvatures of the second microlenses 220. Further, distances n between the first microlenses 210 and the liquid crystal layer 50 are set to be smaller than distances m between the second microlenses 220 and the liquid crystal layer 50.

With the above configuration, light from the light source which is incident on the device is condensed by the first microlenses 210, at first. The condensation degrees of the first microlenses 210 are larger than those of the second microlenses 220 and the first microlenses 210 are closer to the liquid crystal layer 50 in comparison with the second microlenses 220. Therefore, the first microlenses 210 can appropriately condense the incident light from the light source on each of the plurality of pixels. Accordingly, the light can be suppressed from being shielded by a black matrix or the like which defines each pixel, for example. This makes it possible to enhance utilization efficiency of light.

The light condensed by the first microlenses 210 pass through the liquid crystal layer 50, and then, is condensed by the second microlenses 220. The condensation degrees of the second microlenses 220 are smaller than those of the first microlenses 210 and the second microlenses 220 are farther from the liquid crystal layer 50 in comparison with the first microlenses 210. Therefore, the second microlenses 220 can preferably condense the light which is diffused after being condensed by the first microlenses 210 and emit the light to the projection lens 1114 for projecting an image. The light which is not deviated from the F value of the projection lens 1114 can be emitted by the second microlenses 220. This makes it possible to further enhance utilization efficiency of light.

In FIG. 6, the condensation degrees can be also made different between the first microlenses 210 and the second microlenses 220 as described above by making effective diameters of the first microlenses 210 and the second microlenses 220 different from each other. To be more specific, effective diameters r1 of the first microlenses 210 are set to be larger than effective diameters r2 of the second microlenses 220. With this, the condensation degrees can be made different between the first microlenses 210 and the second microlenses 220 without changing the lens shapes. Accordingly, a manufacturing process can be suppressed from being highly complicated.

Figure 7:
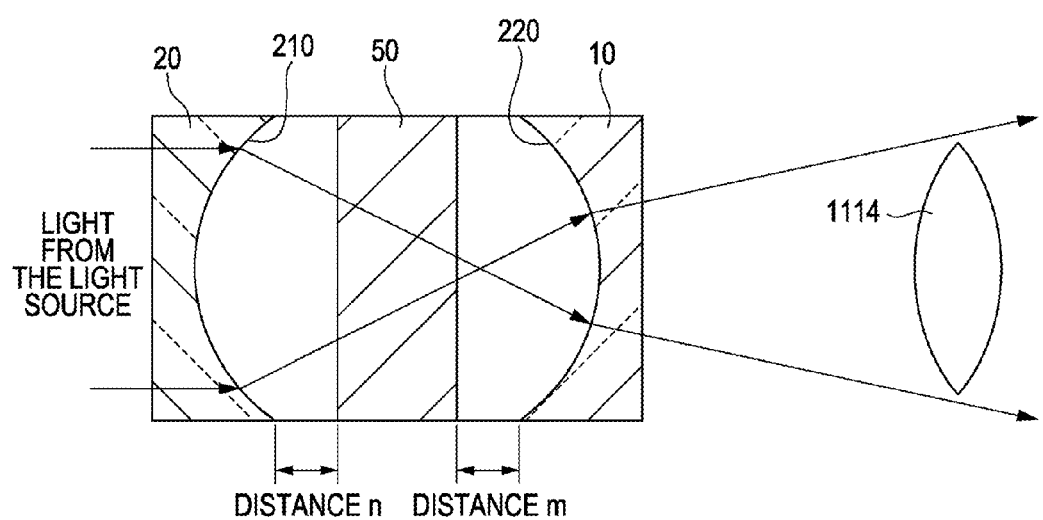
FIG. 7 is an enlarged side view illustrating a configuration of microlenses according to a comparative example.

Next, effects of the microlenses according to the embodiment are described more in detail with reference to a comparative example as illustrated in FIG. 7. FIG. 7 is an enlarged side view conceptually illustrating a state where light emitted from microlenses according to the comparative example is incident on a projection lens.

In FIG. 7, in an electro-optical device according to the comparative example, condensation degrees of the first microlenses 210 and condensation degrees of the second microlenses 220 are set to be the same as each other. Further, distances n between the first microlenses 210 and the liquid crystal layer 50 and distances m between the second microlenses 220 and the liquid crystal layer 50 are set to be the same as each other. That is to say, the first microlenses 210 and the second microlenses 220 are arranged at the light incident side and at the light emitting side, respectively, under the same condition.

With the electro-optical device according to the comparative example, light from the light source which is incident on the device is condensed by the first microlenses 210, at first. Then, the condensed light passes through the liquid crystal layer 50, and then, is incident on the second microlenses 220. However, the second microlenses 220 according to the comparative example have the same condition as the first microlenses 210. Therefore, there is a risk that the second microlenses 220 cannot condense some light other than parallel light or the second microlenses 220 may diffuse such light, on the contrary. In this case, the light emitted from the second microlenses 220 is deviated from a range of the F value of the projection lens 1114 and causes reduction in brightness of an image, as a result.

On the other hand, in the electro-optical device according to the embodiment, the condensation degrees of the first microlenses 210 are set to be larger than the condensation degrees of the second microlenses 220, as described above. Further, the distances n between the first microlenses 210 and the liquid crystal layer 50 are set to be smaller than the distances m between the second microlenses 220 and the liquid crystal layer 50. Accordingly, appropriate condensation can be realized on the first microlenses 210 and the second microlenses 220. This makes it possible to effectively enhance utilization efficiency of light which is incident on the device.

As described above, with the electro-optical device according to the embodiment, a bright image can be displayed with high quality.

Electronic Apparatus

Figure 8:
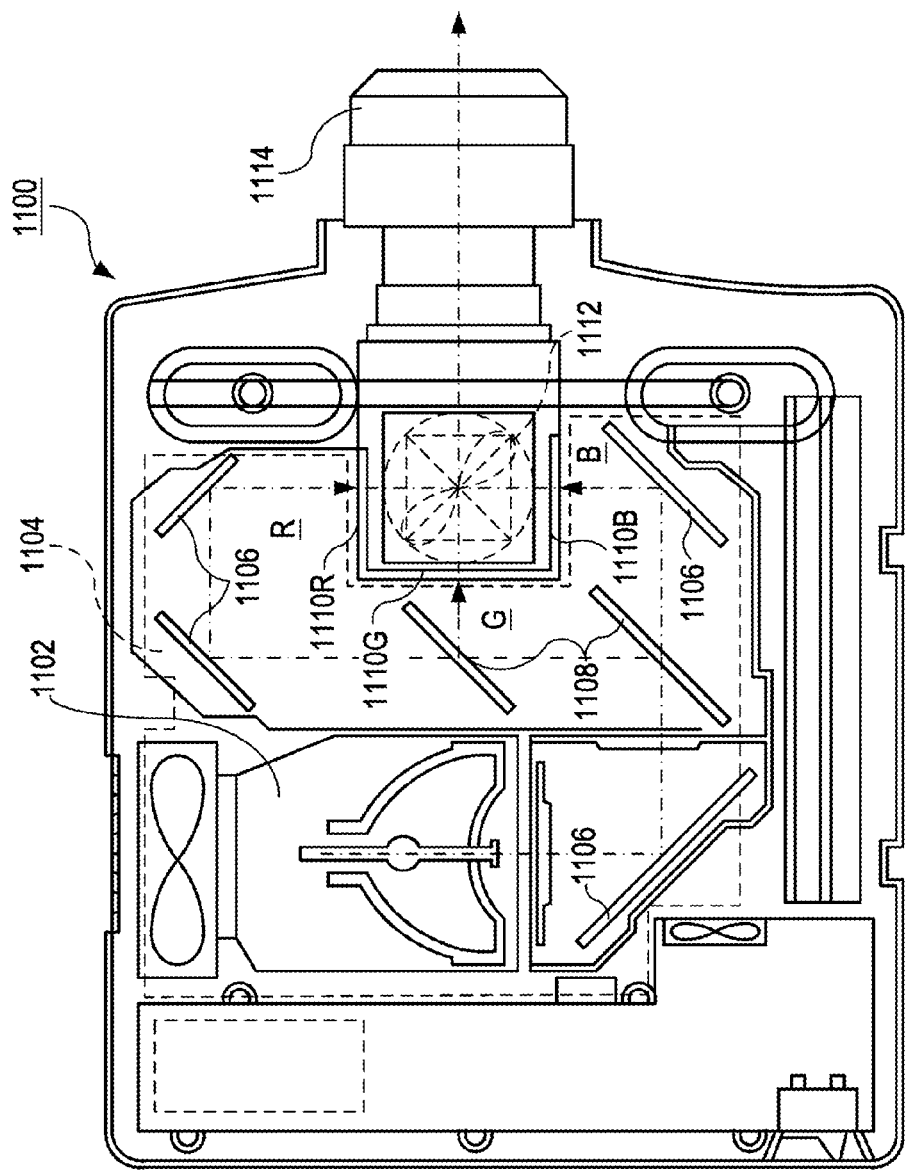
FIG. 8 is a plan view illustrating a configuration of a projector as an example of an electronic apparatus to which the electro-optical device is applied.

Next, a case where the liquid crystal device which is the above-described electro-optical device is applied to various types of electronic apparatuses is described. FIG. 8 is a plan view illustrating a configuration example of a projector. Hereinafter, the projector in which the liquid crystal device is used as a light bulb is described.

As shown in FIG. 8, a lamp unit 1102 formed by a white light source such as a halogen lamp is provided in a projector 1100. A projection light which is projected from the lamp unit 1102 is separated into three primary colors of RGB by four mirrors 1106 and two dichroic mirrors 1108. The four mirrors 1106 and the two dichroic mirrors 1108 are arranged in a light guide 1104. Then, the separated projection lights are incident on liquid crystal panels 1110R, 1110B, 1110G as light bulbs corresponding to each primary color.

Configurations of the liquid crystal panels 1110R, 1110B and 1110G are the same as that of the above liquid crystal device. The liquid crystal panels 1110R, 1110B and 1110G are driven by the primary color signals of R, G and B, which are supplied from an image signal processing circuit. Then, lights modulated by these liquid crystal panels are incident on a dichroic prism 1112 from three directions. In the dichroic prism 1112, lights of R and B are refracted by 90° while light of G goes straight. Accordingly, when images of each color are combined, a color image is projected on a screen or the like through the projecting lens 1114, as a result.

Focusing on display images by the liquid crystal panels 1110R, 1110B and 1110G, the display image by the liquid crystal panel 1110G is required to be reversed symmetrically with respect to the display images by the liquid crystal panels 1110R, 1110B.

It is to be noted that light corresponding to each of the primary colors of R, G and B is incident on each of the liquid crystal panels 1110R, 1110B and 1110G by the dichroic mirrors 1108 so that a color filter is not required to be provided.

In addition to the electronic apparatus which has been described with reference to FIG. 8, a mobile personal computer, a mobile phone, a liquid crystal television, a view finder-type or a direct monitoring-type video tape recorder, a car navigation system, a pager, an electronic organizer, a calculator, a word processor, a workstation, a videophone, a POS terminal, a device including a touch panel, and the like are exemplified. Then, it is needless to say that the invention can be applied to these various types of the electronic apparatuses.

Further, the invention can be also applied to a reflection-type liquid crystal device (LCOS), a plasma display (PDP), a field emission display (FED, SED), an organic EL display, a digital micro mirror device (DMD), an electrophoretic device, and the like, in addition to the liquid crystal device which has been described in the above embodiment.

The invention is not limited to the above embodiment and can be appropriately changed in a range without departing from the scope or the spirit of the invention read from the aspects of the invention and the entire specification. Further, an electro-optical device including such change and an electronic apparatus including such electro-optical device are also encompassed within the technical range of the invention.

This application claims priority from Japanese Patent Application No. 2010-292045 filed in the Japanese Patent Office on Dec. 28, 2010, the entire disclosure of which is hereby incorporated by reference in its entirely.

What is claimed is:

1. An electro-optical device which modulates light incident on a plurality of pixels to modulated light, and emits the modulated light, the electro-optical device comprising:
    an electro-optical material;
    a plurality of first condenser lenses which are arranged at an incident side of the light, one of the plurality of first condenser lenses covering one of the plurality of pixels; and
    a plurality of second condenser lenses which are arranged at an emitting side of the modulated light, one of the plurality of second condenser lenses covering the one of the plurality of pixels,
    wherein a condensation degree of the one of the plurality of first condenser lenses is larger than a condensation degree of the one of the plurality of second condenser lenses, and
    wherein a distance between the one of the plurality of first condenser lenses and the electro-optical material is smaller than a distance between the one of the plurality of second condenser lenses and the electro-optical material.

2. The electro-optical device according to claim 1,
    wherein a lens effective diameter of the one of the plurality of first condenser lenses is larger than a lens effective diameter of the one of the plurality of the second condenser lenses.

3. The electro-optical device according to claim 1, further comprising:
   a pair of substrates which sandwich and hold the electro-optical material,
   wherein the plurality of first condenser lenses is included in one of the pair of substrates that is disposed at the incident side of the light in the pair of substrates, and
   wherein the plurality of second condenser lenses is included in another one of the pair of substrates that is disposed at the emitting side of the modulated light.

4. An electronic apparatus comprising the electro-optical device according to claim 1.

5. An electro-optical device which modulates light incident on a plurality of pixels to modulated light, and emits the modulated light, the electro-optical device comprising:
   an electro-optical material layer;
   a first lens that is arranged at an incident side of the light, the first lens covering one of the plurality of pixels; and
   a second lens that is arranged at an emitting side of the light, the second lens covering the one of the plurality of pixels,
   wherein a condensation degree of the first lens is larger than a condensation degree of the second lens, and
   wherein a distance between the first lens and a surface of the electro-optical material layer at a side of the first lens is smaller than a distance between the second lens and a surface of the electro-optical material layer at a side of the second lens.

6. An electro-optical device comprising:
   an electro-optical material layer;
   a first lens disposed at a light incident side of the electro-optical material layer; and
   a second lens disposed at a light emitting side of the electro-optical material layer,
   wherein a curvature of the first lens is larger than a curvature of the second lens.

7. The electro-optical device according to claim 6,
   wherein a distance between the first lens and the electro-optical material layer is smaller than a distance between the second lens and the electro-optical material layer.

* * * * *